June 4, 1968  C. E. VALENTE  3,386,624
DISPENSING DEVICE FOR POWDERED MATERIAL
Filed Sept. 21, 1966  3 Sheets-Sheet 1

INVENTOR
CARLO ERNESTO VALENTE
BY
ATTYS.

June 4, 1968  C. E. VALENTE  3,386,624
DISPENSING DEVICE FOR POWDERED MATERIAL
Filed Sept. 21, 1966  3 Sheets-Sheet 2

INVENTOR
CARLO ERNESTO VALENTE
BY Silverman & Cass
ATTYS.

United States Patent Office 3,386,624
Patented June 4, 1968

3,386,624
DISPENSING DEVICE FOR POWDERED MATERIAL
Carlo E. Valente, Via G. Ventura 5, Milan, Italy
Filed Sept. 21, 1966, Ser. No. 581,110
4 Claims. (Cl. 222—145)

ABSTRACT OF THE DISCLOSURE

A dispensing device for powdered material capable of delivering metered charges of the powdered material to a receptacle for solving same and subsequent delivery to a predetermined location with rinsing of the receptacle: a metering chamber defined by a pair of driven opercula arranged to provide selective access to and egress from said metering chamber, which chamber is placed in intermittent communicating relation to a source of the powdered material: means are described to move one operculum relative to the other first to load the metering chamber with a charge of powdered material and then to discharge the charge to a receptacle: means are described selectively to tip the receptacle from an upright condition during receipt of powder and solvent to an inclined condition for the discharge of its contents and means also are described to introduce a first metered quantity of water to the receptacle prior to receipt of the metered charge therein and, subsequent to the delivery of said charge, to provide a second metered quantity of water to the receptacle coincident with the discharge of the first metered quantity. Operating and coordinating means in the form of a plurality of cams and linkages are provided for synchronously operating each operculum, the tipping device and the fluid metering device in a predetermined sequence of operation; the invention being described as used in the dispensing of powdered milk product.

---

This invention relates generally to powder dispensing devices and particularly, concerns the provision of a device uniquely suited to dispense, repetitively and with precision, metered charges of powdered milk and deliver each of said charges successively in solution form to a predetermined location usually for utilization in beverages.

Heretofore, devices of the character adapted for handling powdered milk principally incorporate the use of screw feed means to deliver the desired quantity of powdered milk for direct introduction to the beverage. Powdered milk, being hydroscopic in character, has been known to clot within the screw threads whereby either to clog the screw feed means often blocking same, freeze the screw within its bearing structure so that it becomes immovable or to prevent precision in the dispensing of successively metered quantities of milk powder.

Accordingly, it is the principal object of this invention to provide a powdered milk dispensing device which is capable of good precision in delivering successive metered quantities to a selected location for solution thereof and subsequently delivers the thus prepared solution to a predetermined location, ultimately to the beverage container for utilization.

Another object of this invention is to provide a milk powder dispensing device in which clogging or freezing of the feed means thereof is removed as a factor for consideration either in the operation thereof or in obtaining good precision in metering.

Another object of this invention is to provide a milk dispensing device which is not only capable of dispensing successive metered charges of powdered milk with precision but includes means for delivering a metered quantity of fluid to each said charge for dissolving same, means to effect simultaneously delivery of said charge in solution form to a predetermined location and rinsing of the container therefor to prepare same for reuse, and, which also includes cam means keyed to operate said dispensing device sequentially to deliver a solvent to a receptacle and deliver the charge of powder to said receptacle thereafter to incline the receptacle and discharge the solution to a predetermined location simultaneously with delivery of a second solvent supply to the receptacle, subsequent to delivery of the powder thereto, to ready the receptacle for reuse.

A further object of the invention is to provide a powdered milk dispensing device which includes metering means comprising a cam operated pair of opercula arranged to define a metering chamber and keyed to provide selective access thereto and egress therefrom, said metering chamber having an inlet communicating to a source of milk powder and an outlet communicating to the receptacle adapted to receive the metered dose or charge from said chamber.

A still further object of this invention is to provide a powdered milk dispensing device in which a metered charge of milk powder is introduced into a predetermined quantity of water fluid disposed in a pivotally mounted receptacle and cam means are provided to tip the receptacle to deliver the solution therein to a predetermined location for ultimate utilization in a beverage or the like.

Yet a further object of this invention is to provide a powdered milk dispensing device which includes cam means operative to deliver a metered quantity of fluid to a receptacle adapted to receive a metered charge of powdered milk and thereafter, to deliver a second quantity of fluid to the receptacle coincident with the delivery of the first fluid quantity from the receptacle whereby to flush said receptacle and make same ready for reuse.

Additional objects and advantages of the invention will become evident as a detailed description of a preferred embodiment thereof ensues hereinafter with reference to the accompanying drawings.

The invention provides a metering chamber defined by a pair of driven opercula arranged to provide selective access to and egress from said metering chamber, which chamber is placed in intermittent communicating relation to a source of milk powder. Means are provided to move one operculum relative the other to first load the metering chamber with a charge of powdered milk and then discharge the charge to a receptacle. The invention further provides means for selectively tipping said receptacle and means for introducing a metered quantity of water to said receptacle prior to receipt therein of the metered charge of milk powder. The invention additionally provides a plurality of cams and linkages for synchronously operating each operculum, the tipping device and the water metering device in a predetermined sequence of operation.

Figure 1:
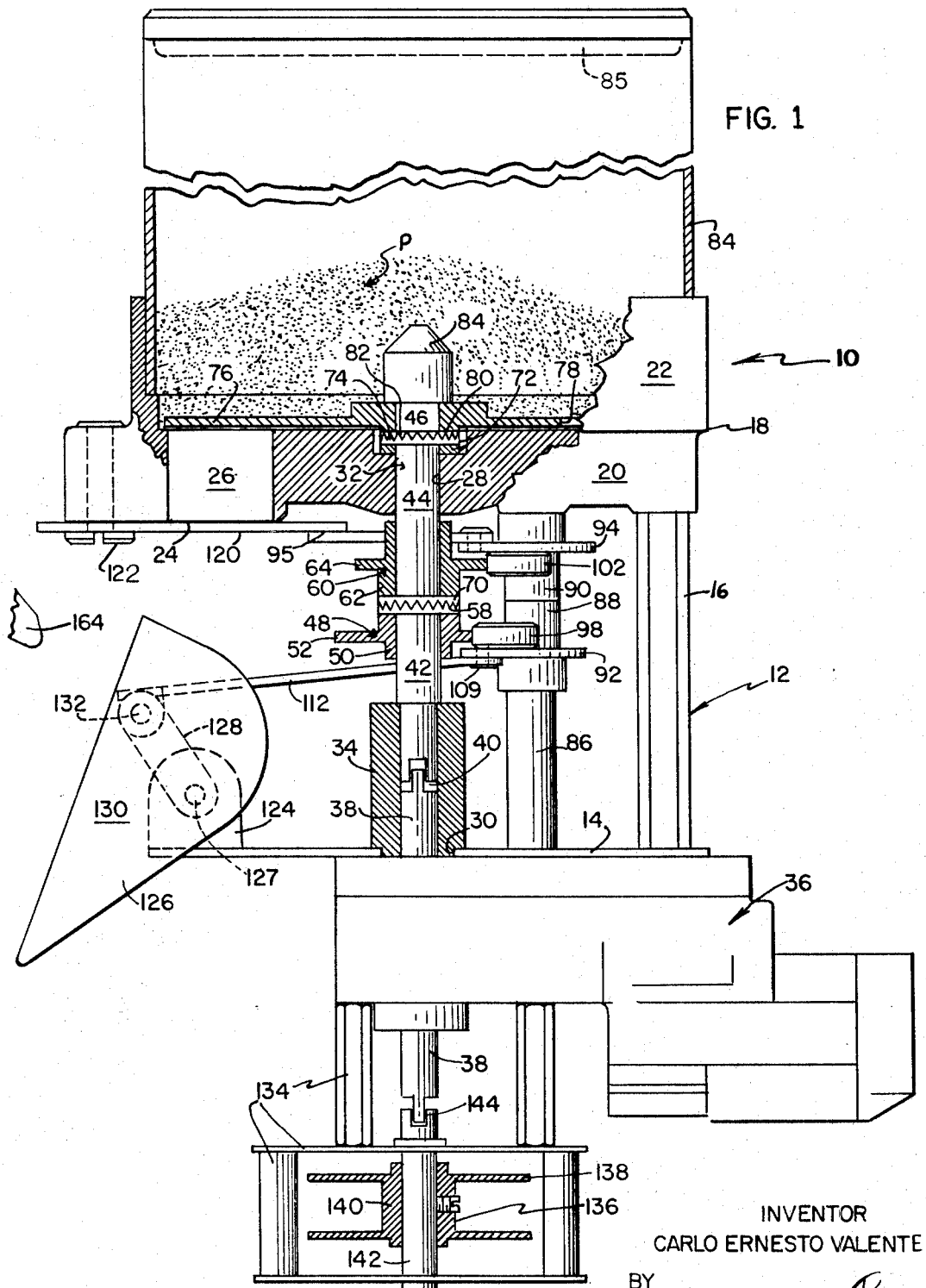
FIG. 1 is an elevational view partially in section of the powdered milk dispensing device according to the invention with a water metering device utilized therewith shown in a fragmentary representation.

Referring now to the drawings for a detailed description of a powdered milk dispensing device constructed in accordance with the invention, in FIG. 1, said device is designated generally by reference character 10. A framework support 12 is provided comprising an apertured horizontally arranged base plate 14, a plurality of vertically arranged support members 16 (only one of which is illustrated for clarity), an upwardly opening dish-shaped cylindrical block 18 mounted on said support members 16 and horizontally arranged superposed over the base plate 14. The block 18 preferably is formed by casting procedures and comprises a thickened circular base 20 and an upwardly extending circumferential wall 22. A cylindrical passage 24 is formed through the base 20 closely adjacent the peripheral edge thereof. The volume within said passage 24 is determined by its diameter and the thickness of the base 20 so that a specific known quantity of material can be contained in the chamber 26 defined by passage 24. The chamber 26 is capable of being closed off at both ends thereof, each end being opened selectively to load and discharge milk powder, as will be explained hereinafter. An aperture 28 is formed in the base 20 and is aligned with an aperture 30 formed in the base plate 14 so that a vertically arranged shaft 32 may be disposed therethrough. The purpose of such shaft 32 will become evident as explained hereinafter.

The shaft 32 is mounted for rotation in journal means 34 secured on base plate 14 and said shaft is drivable by an electric motor assembly 36, including shaft 38 thereof. The motor assembly 36 is mounted to the undersurface of base 14 of frame 12. The shaft 32 is drivingly connected to the shaft 38 of the motor assembly 36 by means of a suitable slot and key connection 40.

The shaft 32 is formed of three sections, 42, 44 and 46. The lower section 42 carries one element of the slot and key connection 40 and carries an excentric cam assembly 48 mounted on its upper end for rotation therewith. The cam assembly 48 includes a bearing means 50 which is mounted at upper end of said shaft section 42 and tightened thereon by a set screw or the like (not shown). The excentric cam 52 extends outwardly of the circumferential wall of the bearing means 50 and is provided with an active edge 54 and an inactive edge 56 (see FIG. 3). A serrated upper surface 58 is provided on the bearing means 50.

Figure 2:
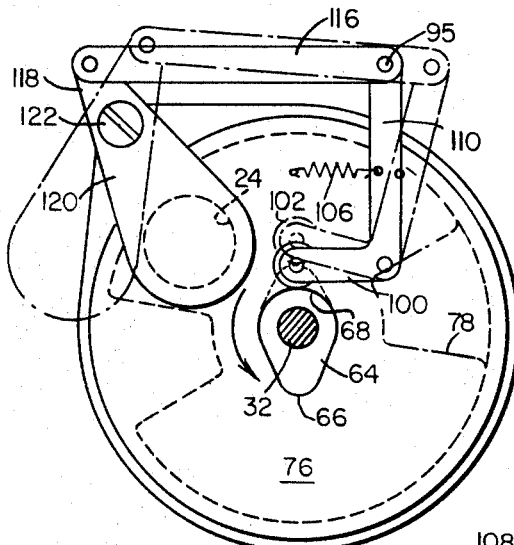
FIG. 2 is a bottom plan view of the milk metering device illustrated in metering condition in full line representation and in dispensing condition in phantom line representation.

Shaft section 44 has a second excentric cam assembly 60 mounted thereto at the lower end thereof. The cam assembly 60 includes a bearing means 62, the excentric cam 64 being formed on and extending outwardly of the circumferential wall of said bearing means 62, said cam 64 also provided with an active edge 66 and an inactive edge 68 (see FIG. 2). Bearing means 62 also includes a serrated portion 70 matingly engageable with serrated surface 58 so that both cams 52 and 64 rotate simultaneously with rotation of the shaft 32, surfaces 58 and 70 functioning as a clutch assembly.

The upper end of shaft section 44 of shaft 32 is journalled in the base 20 passing through aperture 28 thereof. A plate 72 having a serrated upper surface 74 is secured at the upper end of shaft section 44. A circular, planar operculum 76 is mounted on shaft section 46 and includes a portion 80 having a serrated undersurface 82 cooperating with the serrated surface 74 also to function as clutch means so that the operculum 76 rotates with rotation of the shaft 32. A notch 78 is formed in operculum 76 opening to the peripheral edge thereof. The operculum 76 is disposed interior of block 18 closely adjacent base 20 thereof and is of a diameter chosen only slightly less than the inner diameter of the base 20. The depth and width of the notch 78 is chosen so as to be substantially equal to the diameter of passage 24. A nut 84 is disposed at the terminal end of shaft section 46 and tightened against the operculum 76 to assure the fixed relative location of the pair of cam assemblies 48 and 60 and of the operculum 76 along the length of the shaft 32.

Of course, the shaft 32 can just as well be formed of a single section and the said cam assemblies and operculum be mounted by means of cylindrical bearings secured by set screws or the like to the shaft 32 so that their location therealong is fixed. The clutch assemblies also, as well, can be supplied by means suitably disposed and scored washers in place of the serrated surfaces above described.

A cylindrical open-ended vessel 84, preferably formed of light transmissive plastic, is supported mounted with its open end nested within the block 18. Suitable tightening means (not shown) can be provided to fix the vessel 84 against lateral and axial movement. The vessel 84 is closed at its upper end by a removable cover 85. Vessel 84 is adapted to function as a container to hold a supply of powdered milk, P.

A stationary vertical post 86 is positioned bridging the distance between base plate 14 and block 18. Suitably pivotally mounted on the post 86 by means of cylindrical bearings 88 and 90, are bell-crank levers 92 and 94. Bell-crank lever 92 is arranged at a location chosen so that the short arm thereof, arm 96, carrying roller 98 at its free end, is disposed to place the roller 98 in the path of rotation of cam 52 and the bell-crank lever 94 is disposed at a location chosen so that the short arm thereof, arm 100, carrying roller 102 at its free end is disposed to place the roller 102 in the path of rotation of cam 64. Thus, the rollers 98 and 102 serve respectively as cam followers for cams 52 and 64, respectively. Return springs 104 and 106 are secured to the long arms 108 and 110 of levers 92 and 94, respectively, and to the framework 12 at suitable locations thereon.

Elongate link 112 has one end thereof mounted to the free end of arm 108 of lever 92 at pivot point 109 and a hook formation 114 is formed at the other end of said link 112. Link 116 similarly is secured at one end thereof to the long arm 110 of lever 94 at pivot point 95 and has the other end thereof secured to narrow end 118 of a second operculum 120 pivotally mounted by pin 122 to the base 20 of block 18 so that the wide portion thereof normally is disposed immediately below the passage 24 which defines chamber 26 so as to close off the bottom end of the chamber 26. The upper end of the chamber 26 normally is closed by the operculum 76, except where access thereto is permitted by alignment of the notch 78 thereof with the chamber 26. This occurs once during every revolution of the operculum 76.

Upstanding lugs 124 are secured on the base plate 14 closely adjacent one edge thereof and spaced apart pivotally to mount a spoon-shaped cup 126, preferably formed of suitably molded plastic material, at pivot point 127 by means of a plate 128 secured on the side walls 130 of said cup 126. The upper end of plate 128 carries an outwardly extending pin 132 which is engageable with the hook formation 114 of link 112.

A framework generally designated by reference numeral 134 is mounted to the undersurface of the motor assembly so as to support cam means generally designated by reference numeral 136, including circular cam 138 used for controlling the delivery of water. Said cam means 136 has a bearing 140 as a part thereof and is journalled for rotation on a shaft 142 connected by a slot and key connection 144 to the shaft 38 of the motor assembly 36.

Figure 4:
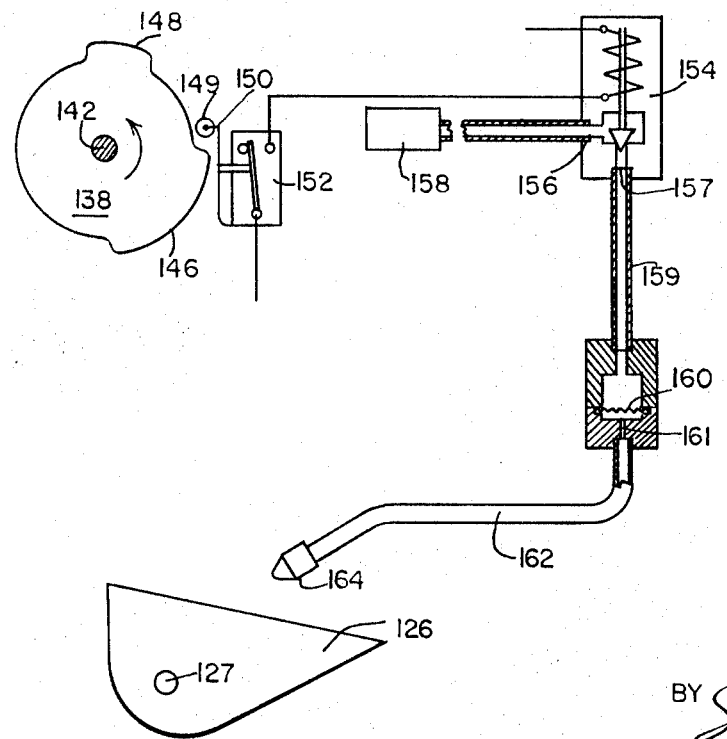
FIG. 4 is a diagrammatic representation of a water metering device utilized in the dispensing device of invention.

Referring to FIG. 4, cam 138 has a pair of spaced dwell surfaces 146 and 148 which are adapted to engage against a roller cam follower 149 carried on arm 150 of switch 152 to close an electromagnetic valve 154.

The inlet 156 of valve 154 leads to a source of water heated to about 40° C. represented by box 158. 40° C. is the optimum temperature for dissolving the milk powder. The outlet 157 of the valve 154 leads, by means of conduit 159 through a filter means 160 to a delivery pipe 162 which has its terminal end 164 closely adjacent the cup 126 over the open top thereof. The rotation of cam 138 is controlled by the motor 36, said motion being keyed to the motion of the shaft 32.

The arrangement of the cam assemblies 48 and 60 is such that in the inoperative condition of the device 10, the active surface 54 of cam 52 is engaged upon its follower roller 98 to move the bell-crank 92 against its spring bias and tip the cup 126. Access to the chamber 26 is denied to the milk powder disposed in vessel 84 since the entry thereto is blocked by operculum 76. The switch 152 is open since the cam 138 is not disposed with its dwell surfaces 146 and 148 in contact with arm 150 thereof. Therefore, valve 154 is closed.

Immediately upon energization of the motor assembly 36, rotation of shaft 32 initiates in the direction indicated by the arrows. The operculum 76 is rotated to align notch 78 with the passage 24 defining chamber 26 and milk powder is introduced by gravity feed into the chamber to fill same, thereafter with continued rotation of operculum 76, the entry to the chamber 26 from vessel 84 is sealed off.

Figure 3:
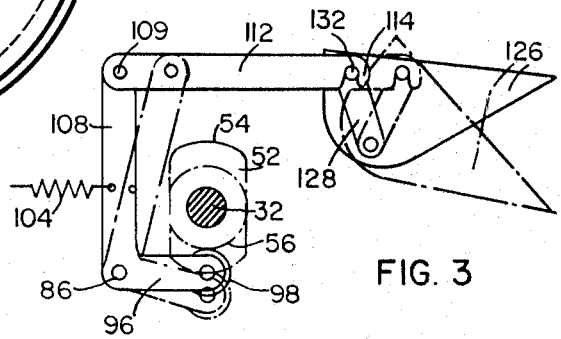
FIG. 3 is a diagrammatic elevational view of the tipping device of the invention, the loaded condition thereof being illustrated in full line representation and the dispensing condition thereof being illustrated in phantom line representation.

The active surface or edge 54 of cam 52 is released from the roller 98 and the bell-crank 92 returns to its normal position, righting the cup 126, as shown in full line representation in FIG. 3. At the same time, the cam 138 has been rotated sufficiently to place the dwell surface 146 in contact with roller 149 carried on arm 150 of switch 152 to close the switch, and this opens valve 154, causing the delivery of water to the cup 126. The metering of the volume of water delivered to the cup 126 is controlled by the length of time of the dwell, controlled by the surface length of the dwell surfaces 146 and 148 of cam 138, each remains in contact with roller 149, as well as by the diameter of outlets 157 and 161 of the valve 154 and filter means 160, respectively.

Now, the active surface 66 of cam 64 has been rotated to engage its follower roller 102 and act upon bell-crank lever 94 to move the operculum 120 from its initial position sealing off the egress end of passage 24, and the milk powder charge in chamber 26 is released to fall, under gravity, into the cup 126 which now contains a metered supply of water. By the time the charge is delivered to the cup 126, the dwell surface 146 of cam 138 has disengaged from the roller 149 carried by arm 150 of switch 152, and the valve 154 closed, cutting off flow of water into the cup 126.

Further rotation of the shaft 32 continues and the cup 126 thus is tipped by the action of cam 52 upon bell-crank 92. At the same time as the cup is tipped to discharge its contents, that is, the charge of milk powder dissolved in the first supply of heated water, the second dwell portion 148 of cam 138 moves switch arm 150 and effects opening of the valve 154 to release a second metered supply of water to the tipped cup 126. This second supply of water acts as a flushant for the cup 126 and dissolves and/or flushes from the cup 126 any powdered milk which may have failed to be dissolved in the first metered supply of water. In the meantime, the operculum 120 is returned to its normal position. Thus, the chamber 126 is once again sealed.

Referring to FIGS. 5 to 8 inclusive, and in summary, I have provided a framework 12 on which is supported a dished block 18 which supports a vessel 84 adapted to hold powdered milk. A cylindrical open-ended chamber 26 is formed in the block 20, the capacity of which is equal to the desired charge or dose of milk powder to be dispensed. At the pair of open ends of chamber 26, said chamber can be closed by means of a pair of projecting opercula 76 and 120 fastened to a rotatable shaft 32 journalled in the frame 12 and operated by an electric motor assembly 36 so that the shaft 132 rotates in the direction of the arrow (see FIG. 6).

Figure 5:
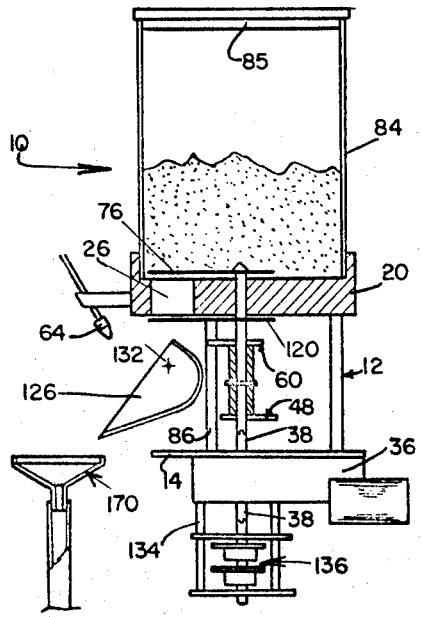
FIG. 5 is a diagrammatic view partially in section of the powdered milk dispensing device according to the invention, on a reduced scale, illustrating the inactive condition of the device.
Figure 6:
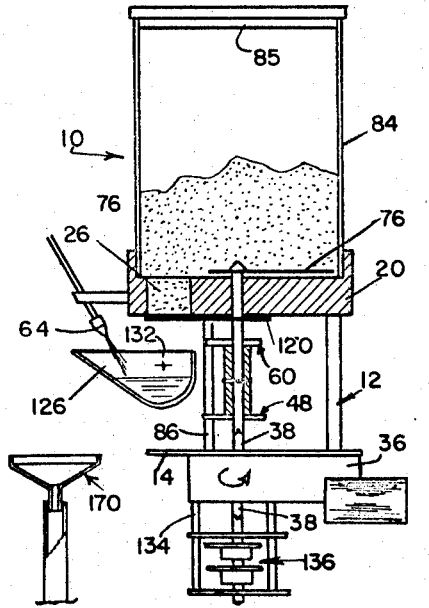
FIG. 6 is a view similar to that of FIG. 5 but illustrating the condition of the device assumed during the metering of a charge of milk powder and illustrating the loading of a metered quantity of water to the receptacle intended to receive the charge upon delivery thereof.

The two opercula are shaped and assembled so that in the position diagrammatically represented in FIG. 5, they close the two ends of chamber 26, which is empty at this stage. After rotation of the shaft 132 to the stage illustrated in FIG. 6, the operculum 76 has left open the upper end of chamber 26 to permit descent of the milk powder from vessel 84 into chamber 26 to fill said chamber since the lower end of same is still sealed by operculum 120.

Below the chamber 26 is disposed a spoonlike cup 126 swung around a horizontal pivot journalled on bracket means 124 secured to frame 12.

The tipping or pivoting of the cup 126 is controlled by cam assembly 48 mounted to the rotatable shaft 32. The cup 126, from a tipped condition of FIG. 5, is urged to the righted condition to receive a metered supply of water from nozzle 164 controlled by an electromagnetic valve 154 in turn controlled by a circular rotating cam 138 driven by the same motor assembly 36.

Figure 7:
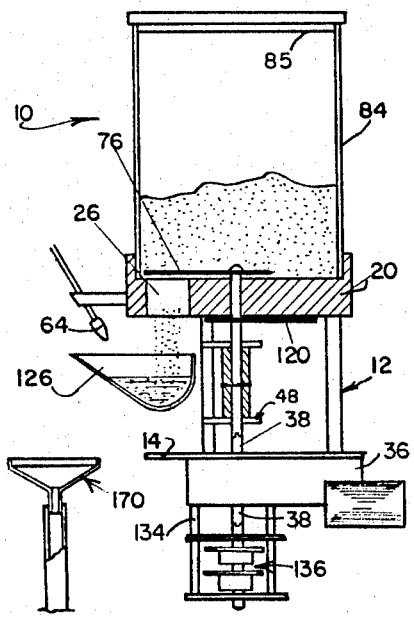
FIG. 7 is a view similar to those of FIGS. 5 and 6 but illustrating the condition of the device assumed upon delivery of the charge of milk powder to the loaded receptacle.

Further rotation of the shaft 32 causes the operculum 76 to seal the top end of chamber 26 but moves the operculum 120 from its sealing position at the lower end of the chamber 26 to open same permitting the charge in said chamber to drop into the water containing cup 126 as shown in FIG. 7. This is accomplished by cam assembly 60.

Figure 8:
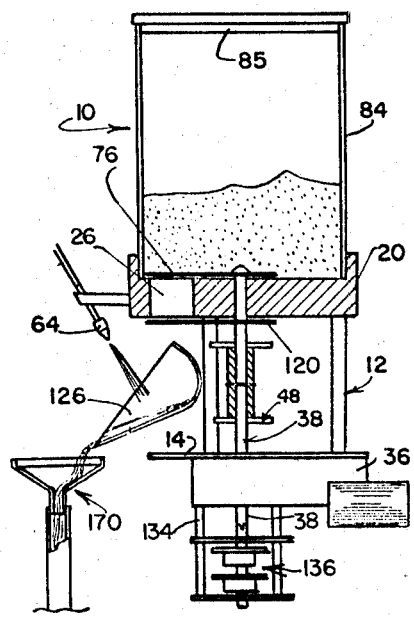
FIG. 8 is a view similar to those of FIGS. 5, 6 and 7 but representing the condition of the device assumed on delivery of the solution in the receptacle to a predetermined location and the simultaneous delivery to the receptacle of a metered quantity of water which functions as a flushant.

After a further rotation of shaft 32 to place the device 10 in a condition shown in FIG. 8, the operculum 120 returns to its sealing position and the cup 126 is tipped causing the contents thereof to flow to the point of utilization represented by the funnel and pipe assembly 170. At the same time, a second metered supply of water is delivered to the tipped cup 126 from nozzle 164 to rinse the cup 126. The metered rinse water helps to dilute the beverage and milk dispensed thereinto and such dilution is desirable.

It is evident that while this invention has been described with reference to its application to the dispensing of powdered milk to ultimate utilization in beverages, the device according to the invention is equally adapted to use in the metered dispensing of any solvable powder and ultimate dispensing thereof in solution form.

I claim:

1. A dispensing device for powdered material particularly for use in beverages comprising a receptacle, means for delivering a volumetrically metered quantity of powdered material from a source thereof to the receptacle, said receptacle being pivotally mounted below said metering means, cam and link means for moving said receptacle between an inclined condition and an upright condition, means for supplying fluid from a source thereof to said receptacle when the same is in the upright condition, said metered quantity of powdered material being delivered to said receptacle when the same is in the upright condition and said receptacle being placed in inclined condition for delivery of the thus formed solution to a desired location, said means for supplying fluid to said receptacle providing a second supply of fluid to the receptacle when the same is in an inclined condition.

2. A dispensing device for powdered material comprising, in combination, a vessel containing said material, receptacle means for receiving a metered charge of said material, feed means communicating between said vessel and said receptacle, means for volumetrically metering said charge of said material to said receptacle means, means for introducing selected amounts of solvent from the source thereof to said receptacle means for dissolving said charge, means for delivering said charge from said receptacle means to a predetermined location for utilization thereof, drive means for imparting motion to the aforesaid plurality of means, said feed means comprising a metering chamber defined between the vessel and the receptacle means, said chamber having inlet and outlet ends, a pair of rotatably mounted opercula, one at each end of said chamber to seal same, one of said opercula being disposed interior of the vessel and being movable to permit powder from said vessel to enter said chamber through the inlet end thereof to load same and the other operculum being arranged selectively thereafter to uncover said outlet end to release the charge from the chamber, said drive means being directly operable upon one of said opercula, and said receptacle means comprising a cup-like container pivotally mounted below said chamber and arranged to be moved between a tipped and an upright condition, cam and link means for synchronizing the various motions in a predetermined sequence, said cam and link means being interposed between the other operculum and the drive means and said cam and link means including a cam and link arrangement keyed to the rotation of said opercula to place the container in upright condition during the loading of said chamber and release therefrom of the metered charge, said cam and link arrangement being drivingly connected to said drive means and arranged selectively to place the container in its tipped condition for dispensing of the contents thereof.

3. The dispensing device as claimed in claim 2 in which the container is spoon-shaped in configuration thereby to release all its contents when in the tipped condition.

4. The dispensing device as claimed in claim 2 and control means operable to deliver a first metered quantity of solvent to the container during its upright condition and a second metered quantity of solvent to the container when same is in the tipped condition, said control means being operably connected to said drive means.

References Cited

UNITED STATES PATENTS

| | | | |
|---|---|---|---|
| 2,996,974 | 8/1961 | Fry | 99—289 X |
| 2,996,975 | 8/1961 | Fry | 99—289 |
| 3,064,553 | 11/1962 | Simjian | 99—289 |
| 3,171,344 | 3/1965 | Mathieu et al. | 99—289 X |
| 3,208,369 | 9/1965 | Greenly et al. | 99—289 X |
| 3,221,637 | 12/1965 | Small et al. | 99—289 |
| 3,305,139 | 2/1967 | Ward | 222—557 X |

ROBERT B. REEVES, *Primary Examiner.*

N. L. STACK, *Assistant Examiner.*